(12) United States Patent
Hampton et al.

(10) Patent No.: US 9,707,498 B2
(45) Date of Patent: Jul. 18, 2017

(54) FILTRATION SYSTEM AND METHOD (71) Applicant: Filtration Technology Corporation, Houston, TX (US)

(72) Inventors: John Hampton, Houston, TX (US); Greg Wallace, Houston, TX (US)

(73) Assignee: FILTRATION TECHNOLOGY CORPORATION, Houston, TX (US)

( * ) Notice: Subject to any disclaimer, the term of this patent is extended or adjusted under 35 U.S.C. 154(b) by 1050 days.

(21) Appl. No.: 13/829,861

(22) Filed: Mar. 14, 2013

(65) Prior Publication Data

US 2014/0263106 A1     Sep. 18, 2014

(51) Int. Cl.
| | |
|---|---|
| *B01D 29/50* | (2006.01) |
| *B01D 29/11* | (2006.01) |
| *B01D 29/54* | (2006.01) |
| *B01D 29/66* | (2006.01) |
| *B01D 36/00* | (2006.01) |
| *B01D 29/60* | (2006.01) |
| *B01D 29/68* | (2006.01) |

(52) U.S. Cl.
CPC ............ *B01D 29/50* (2013.01); *B01D 29/114* (2013.01); *B01D 29/54* (2013.01); *B01D 29/606* (2013.01); *B01D 29/661* (2013.01); *B01D 29/68* (2013.01); *B01D 29/688* (2013.01); *B01D 36/001* (2013.01); *B01D 2201/087* (2013.01)

(58) Field of Classification Search
None
See application file for complete search history.

(56) References Cited

U.S. PATENT DOCUMENTS

| | | | |
|---|---|---|---|
| 1,780,723 | A | 11/1930 | Short |
| 3,926,806 | A | 12/1975 | Gaudet |
| 4,289,630 | A | 9/1981 | Schmidt, Jr. et al. |
| 5,160,442 | A | 11/1992 | Hampton |
| 6,248,243 | B1 | 6/2001 | Farley |
| 8,158,002 | B1 | 4/2012 | Lupto et al. |
| 2006/0231487 | A1 | 10/2006 | Bartley et al. |
| 2012/0132597 | A1 | 5/2012 | Byalskiy et al. |
| 2014/0263106 | A1* | 9/2014 | Hampton ............... B01D 29/50 210/798 |

OTHER PUBLICATIONS

Written Opinion 237 for PCT/US14/20441; dated Aug. 5, 2014; 6 pages.*

* cited by examiner

*Primary Examiner* — Robert James Popovics
(74) *Attorney, Agent, or Firm* — Boulware & Valoir (57) ABSTRACT

Method and apparatus are provided for treating and removing particulate matter from fluid or treating and removing fluid from a recoverable particulate matter from fluid circulating into, through and out of an industrial operation, and for washing a disposable cartridge filter used therein. The influent fluid is maintained at a flow rate such that the differential pressure across the cartridge filter is no greater than 10 psi to prevent the buildup of non-porous filter cake. A pressure detecting mechanism and method is also provided to detect the amount of deposited particulate matter inside the cartridge filter, so that an operator can determine whether the cartridge filter should be taken out to remove or recycle the deposited particulate matter.

11 Claims, 8 Drawing Sheets

FILTRATION SYSTEM AND METHOD

PRIOR RELATED APPLICATIONS

Not applicable.

FEDERALLY SPONSORED RESEARCH STATEMENT

Not applicable.

REFERENCE TO MICROFICHE APPENDIX

Not applicable.

FIELD OF THE DISCLOSURE

The invention relates to a method and apparatus for cleaning fluid or capturing particulate matter from a fluid used in an industrial operation, such as a water purification plant, a completion or workover operation of a subterranean well, chemical process requiring recovery of a catalyst, or the like, wherein a cartridge filter which can be disposable is used to clean the fluid without production of a substantially non-porous solids filter cake around the exterior of the cartridge filter and, if desired, the particulate matter can be recovered easily.

BACKGROUND OF THE DISCLOSURE

Cartridge filters are well known to those skilled in the art of cleaning fluids used in industrial operations, such as a water purification plant, a completion or workover operation of a subterranean well, chemical process requiring recovery of a catalyst, refinery and chemical manufacturing operations or similar. Cartridge filters for disposable use are generally made of filter media that is fiber or paper-like substance and are designed to be received within a vessel housing same and are removed, disposed of, and replaced with new filters as needed. In industrial operations wherein a fluid, such as water or the like, is to be cleaned of particulate matter or a catalyst, such as fine sand, silt, catalyst fines, and other similar solids, which is deemed to be a contaminate or recoverable product for one reason or another. Other filter cartridges are made of a variety of media including metal, polymer or a combination of different filter media and can be used depending on the desired processing. These filters can become clogged in a similar manner to disposable cartridges.

When fluids associated with such industrial operations are cleaned incorporating such cartridge filters, a filter cake formed of said particulate or recoverable matter can be expected to accumulate around the exterior surface of the cartridge filter when the flow is from exterior to interior, and in some cases, the particulate matter will penetrate into the filter media itself, reducing the effectiveness of the cleaning operation and the rate of flow of fluid therethrough and otherwise adversely affecting the filtering operation. As a result of the clogging of the filter media, the cartridge filters must be cleaned or replaced from time to time. Such cleaning or replacement is often time consuming and otherwise costly, resulting in considerable downtime for the flow of fluid during the industrial operation.

Also, in some operations such as precious metals processing, catalyst recovery or other processing, the particulate matter in the fluid is valuable. A practical way to recover the particulate matter is desired in addition to extending the life of the filter.

In the past, those skilled in the art have attempted to extend the useful life of such disposable cartridge filters by, for example, controlling the pressure of the flow through the filtering system to eliminate or greatly reduce any differential pressure across the cartridge filter exterior surface to avoid a buildup of such a non-porous filter cake. Typical of such procedures is that disclosed in U.S. Pat. No. 1,780,723, entitled "Control for Oil Filters", U.S. Pat. No. 3,926,806, entitled "No-Bypass Filter System," and U.S. Pat. No. 5,160,442, entitled "Method of cleaning a disposable cartridge filter."

SUMMARY OF THE DISCLOSURE

The present invention provides a method and apparatus for removing particulate or recoverable matter from fluid circulating into, through and out of an industrial operation, as well as a method and apparatus for reducing particulate matter deposited on the disposable cartridge filters by maintaining a specific flow rate range per filter surface area per minute.

By controlling the flow rate and the flow path into the filter vessel, particles will tend to settle out by gravity and not become deposited around the exterior of the cartridge filter during the filtration process. The particles in the filtration fluid will not tend to build up on the exterior of the filter media. Accordingly, the particles that adhere on the filter media of the filter are not compressed and do not develop any significant thickness because the force of gravity acting on the particles will be greater than the fluid flow force holding the most of particles on the filter media. Accordingly, any particle layering that develops on the filter media will be porous and will retain its permeability and allow the fluid flow rate to be maintained through the media.

In the past, those skilled in the art of incorporating filters, typically cartridge filters, into cleaning operations for industrial applications have encountered considerable problems in cleaning of such cartridge filters upon the occurrence of a buildup of particles or filter cake on the media. When such cartridge filters are cleaned by reversing flow of fluid through such filters, the resultant dirty fluid, produced by the particulate matter re-suspended in the fluid, must be disposed of in some environmentally acceptable manner. The present invention addresses such a problem by providing a system for detecting and cleaning of such cartridge filters in situ. The system incorporates the use of compressed air or gas to provide an agitation of the filter's interior and exterior surfaces to dislodge any particles that may adhere to the filter media that have not been collected in the filter cake by gravity. The particulate matter is collected in an interior-to-exterior cartridge filter in the filter vessel by gravity below the filter cartridge. In a subsequent step, any particulate matter that adhered to the filter media during the filtration can be removed by compressed air on the exterior and interior surfaces as described above. The particulate matter dislodged in this step also falls by gravity to the bottom of the vessel, into the interior-to-exterior cartridge filter. The cleaned filter cartridge can be re-used. The filter cake can be collected and re-used if the particulate matter is valuable, or discarded if the particulate matter is not desirable.

The present invention also provides an apparatus for removing the particulate matter deposited on the filter and dislodging and collecting the deposited particulate matter. The apparatus comprises a filter vessel that houses an exterior-to-interior filter in the upper chamber and an interior-to-exterior filter, each filter having an inner hollow core. Typically, the filters used are cylindrical cartridge filters with a rigid outer sleeve surrounding the filter media, but any type of filter can be used. Between the two filters are part of the filter vessel, including a spacer plate with a solids funnel ring on the interior of the vessel to guide the particulate matter into the inner hollow core of the interior-to-exterior cartridge filter. A fluid inlet is provided for introducing the influent fluid to be filtered into the filter vessel. The fluid inlet is configured such that the entry flow path of the influent fluid swirls around the interior of the filter vessel during filtration operation below the filter in the upper chamber. A clean fluid outlet is provided and in fluid communication with the inner hollow core of the exterior-to-interior cartridge filter where the filtered fluid collects. A first air inlet is provided and connected to an air diffuser located inside the inner hollow core of the exterior-to-interior cartridge filter. A second air inlet is provided and connected to an air distribution ring located below the exterior-to-interior cartridge filter, wherein the air distribution ring has a diameter equal to or slightly larger than the outer diameter of the exterior-to-interior cartridge filter. A perforated tube is provided inside the inner hollow core of the interior-to-exterior cartridge filter. The perforated tube is further connected to an air flow volume detector for measuring the amount of particulate matter accumulated inside the interior-to-exterior cartridge filter. A cylindrical baffle can also be disposed above the air distribution ring and around the filter in the upper chamber to direct the bubbles to the exterior of the exterior to interior filter.

The method includes the steps of feeding a fluid to be filtered with particulate matter into the filter housing at a flow rate that does not form non-porous layer of particulate matter on at least one cartridge filter inside the filter housing; collecting the particulate matter in a filter cake below the filter cartridge, cleaning the at least one cartridge filter housing by introducing a pressurized gas into the filter housing to dislodge the particulate matter deposited on said cartridge filter with the dislodged particulate matter collected in the filter cake; and determining the amount of dislodged particulate matter accumulated within the cartridge filter.

In addition, the present invention also provides a system and method of determining the amount of particulate matter accumulated inside the vessel, especially in the interior-to-exterior filter, so that an operator can determine the amount of the filter cake accumulated below the filter cartridge. The method comprises introducing a predetermined amount of gas inside the cartridge filter, and measuring the rate of pressure reduction to determine whether and to what extent the interior-to-exterior cartridge filter is filled with the particulate matter. A perforated tube is extended to the inner hollow core of the cartridge filter for introducing the gas, and a pressure sensor and/or pressure transducer is also provided to detect the change in pressure. When the cartridge filter is filled with the particulate matter, which in turn blocks the perforation such that the introduced gas is less likely to escape, and therefore the rate of pressure reduction is slower.

In some instances, the particulate material present in the influent fluid to be filtered can be recovered and may even have economic value. For example, the catalyst suspended in a reactant fluid can be filtered and recovered for further use. Therefore it would be beneficial to provide an efficient way of filtering and recovering the particulate matter within the influent fluid.

In this form of the invention the disposable cartridge filter located in the upper chamber of the filter housing is hydraulically agitated by the pneumatic injection of an inert gas, such as air, providing a throttling or vibratory action, to remove any contaminate or recoverable particulate matter in cake or non-cake form from around the exterior of the cartridge.

As used herein, "pressurized gas" means the gas being introduced into the filter housing is pressurized to higher than one atmosphere. Depending on actual application, different nature of the deposited particulate matter or the influent, the pressurized gas has a pressure no greater than 50 psi, and in a preferred embodiment no greater than 20 psi.

As used herein, "differential pressure" refers to the pressure difference between the exterior and interior of a cartridge filter.

As used herein, "cartridge filter" can be disposable or non-disposable filters, depending on different application or operator's need.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

DETAILED DESCRIPTION

The disclosure provides novel system and method for reducing and removing the particulate matter deposited on the surface of cartridge filters within a filter housing. In one aspect of the invention, a method for removing particulate matter in a fluid to be filtered is provided, where particulate matter is deposited in a filter housing. The method comprises the steps of: a) feeding the fluid to be filtered containing particulate matter into the filter housing with at least one first filter in the upper portion of the housing at a flow rate and pressure that will not form a non-porous filter cake on the filter in the upper portion; b) continuing to feed the fluid to be filtered containing particulate matter into the filter housing at the predetermined flow rate and pressure allowing the particulate matter to fall by gravity into a second filter in the lower portion of the housing; c) cleaning the first filter in the upper portion of the filter housing by introducing a pressurized gas into the filter housing to dislodge the particulate matter deposited on the first filter; and d) collecting dislodged particulate matter accumulated within the second filter in the lower portion of the filter housing.

In another aspect of this invention, a system of removing particulate matter in a fluid to be filtered is provided. The system comprises: a) a generally cylindrical filter housing with an inlet for introducing a fluid to be filtered that contains particulate matter, a clean fluid outlet, a first gas inlet, an exterior-to-interior filter in an upper chamber of the filter housing above an interior-to-exterior filter in a lower chamber of the filter housing; b) the inlet for introducing the fluid to be filtered located on the housing between the exterior-to-interior filter on the upper chamber and the interior-to-exterior filter in the lower chamber extending at an angle inside the housing to direct the fluid flow in a circular flow around the inside of the filter housing; c) the exterior-to-interior filter on the upper chamber having a hollow core in communication with the clean fluid outlet; d) the interior-to-exterior filter in the lower chamber having a hollow core in communication with the bottom portion of the upper chamber; and e) a gas diffuser in communication with said first gas inlet and located within the hollow core of the exterior-to-interior filter in the upper chamber of the filter housing.

In one embodiment, the method further comprising the step of removing the accumulated particulate matter from the second filter.

In another embodiment, the method further comprises a step for measuring the amount of particulate matter in the second filter, wherein the measuring step is carried out by first introducing a predetermined volume of gas into a means for measuring pressure change within a hollow core of the second filter in the lower portion of the filter housing as it fills with particulate matter; and measuring the rate of pressure change within the hollow core of the second filter in the lower portion of the filter housing.

In one embodiment, the flow rate of the fluid to be filtered is maintained such that the differential pressure across the first filter is no greater than 10 psi, and preferably no greater than 2 psi and no less than 0.1 psi. In another embodiment, the flow rate is 1.5 gallon/minute, and preferably 2.0 gallon/minute, and more preferably 2.5 gallon/minute.

In one embodiment, the exterior-to-interior filter comprises a filter media having a pore size of less than 5 micrometers, and preferably having a pore size of 2 micrometers.

In one embodiment, the system further comprises an annular spacer in the housing between the upper chamber and the lower chamber, wherein the interior surface of the annular spacer is sloped to form an interior angled connection between the upper chamber and the lower chamber. The system may further comprise a solids funnel ring under the annular spacer within the filter housing. The solids funnel ring is preferably sloped at an angle between 20 and 30°. In another embodiment, the interior surface of the annular spacer is sloped at an angle between 80 and 90°

Figure 1A:
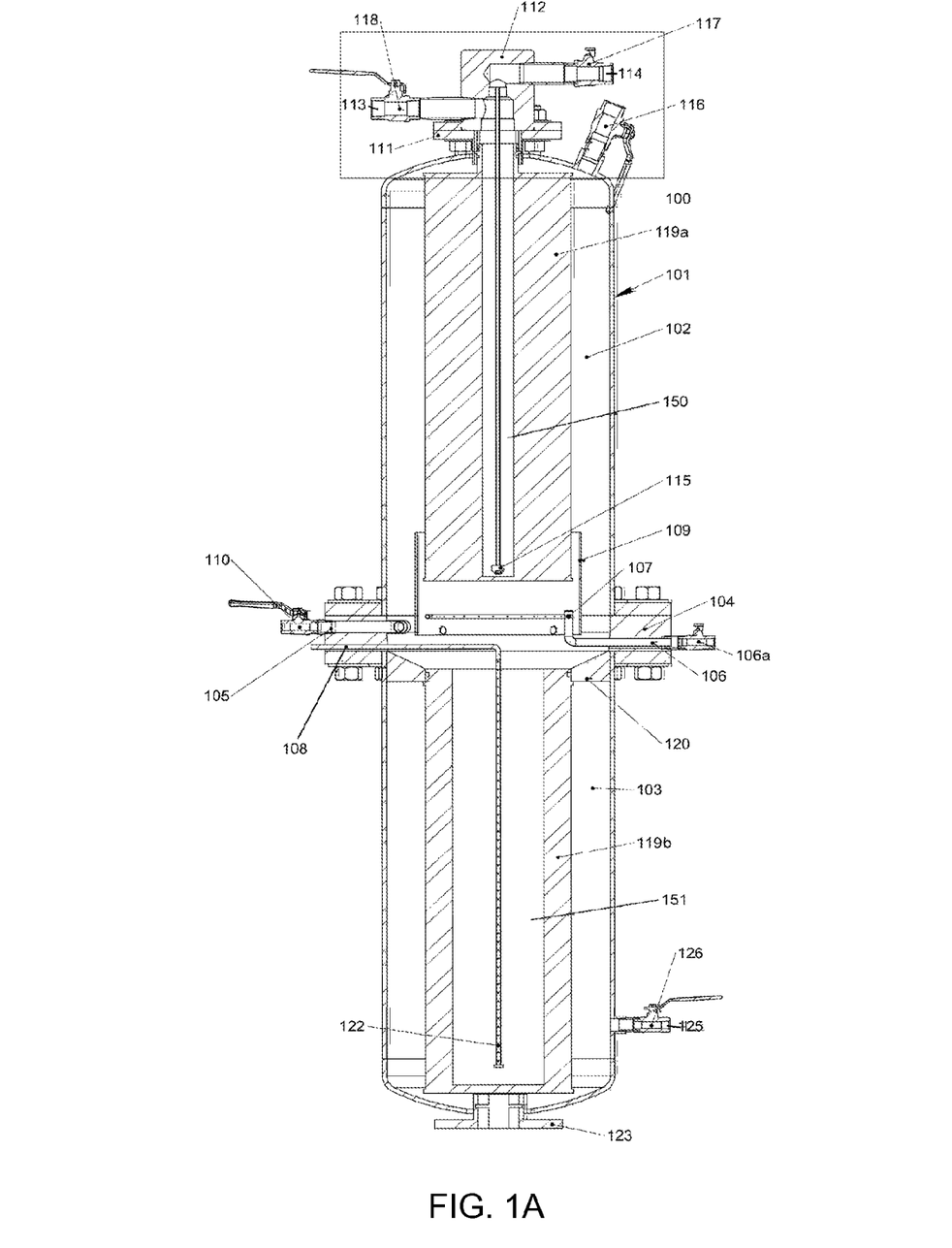
FIG. 1A is a cross-section of the filter housing and the placement of the disposable cartridge filters during the filtration stage.

With reference to FIG. 1A, there is shown a filtering system 100 which generally comprises a single vessel 101. The vessel 101 defines an upper fluid chamber 102 and a lower fluid chamber 103, which are always in fluid communication. At the top of the vessel 100 is a cartridge receiver 111 for attachment of the exterior-to-interior flow disposable cartridge filter 119a that is located inside upper fluid chamber 102. Integrated to the cartridge receiver 111 is a dual flow crossover 112 with ports defined as the clean fluid outlet 113 and contains valve 118 of known construction, which is selectively movable between open and closed positions for clean fluid outlet. An air inlet line 114 also enters the dual flow crossover 112 and contains a valve 117 that is selectively movable between open and closed positions in communication with an air diffuser 115 located within and extends through the inner hollow core 150 of the disposable cartridge filter 119a. The clean fluid outlet 113 and the air inlet 114 are both in fluid communication with the clean fluid inside the exterior-to-interior cartridge filter 119a. Although the clean fluid outlet 113 and the air inlet line 114 are shown as a dual flow crossover 112 in this embodiment, the two can each have an independent passageway and construction for the respective fluid/air without affecting the functionalities of this invention.

Figure 1B:
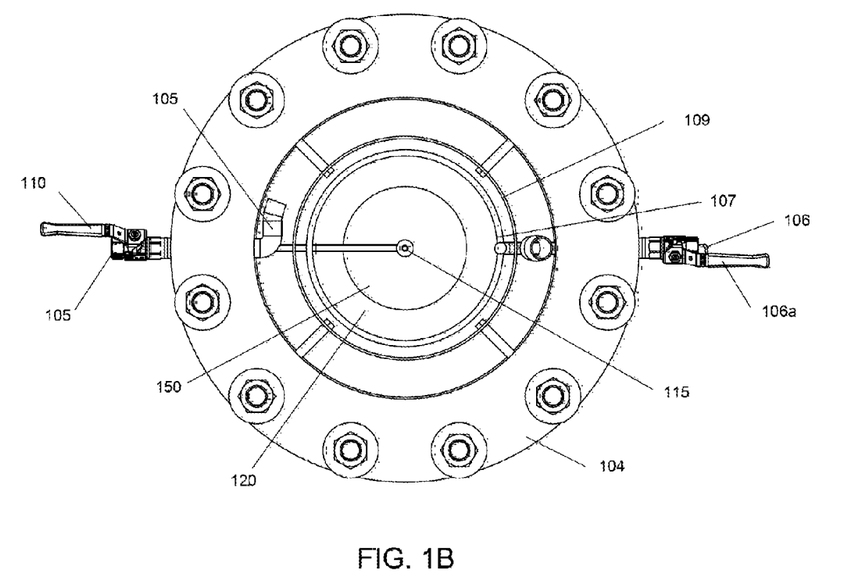
FIG. 1B shows the top-down view of the filter housing with its top opened.
Figure 7:
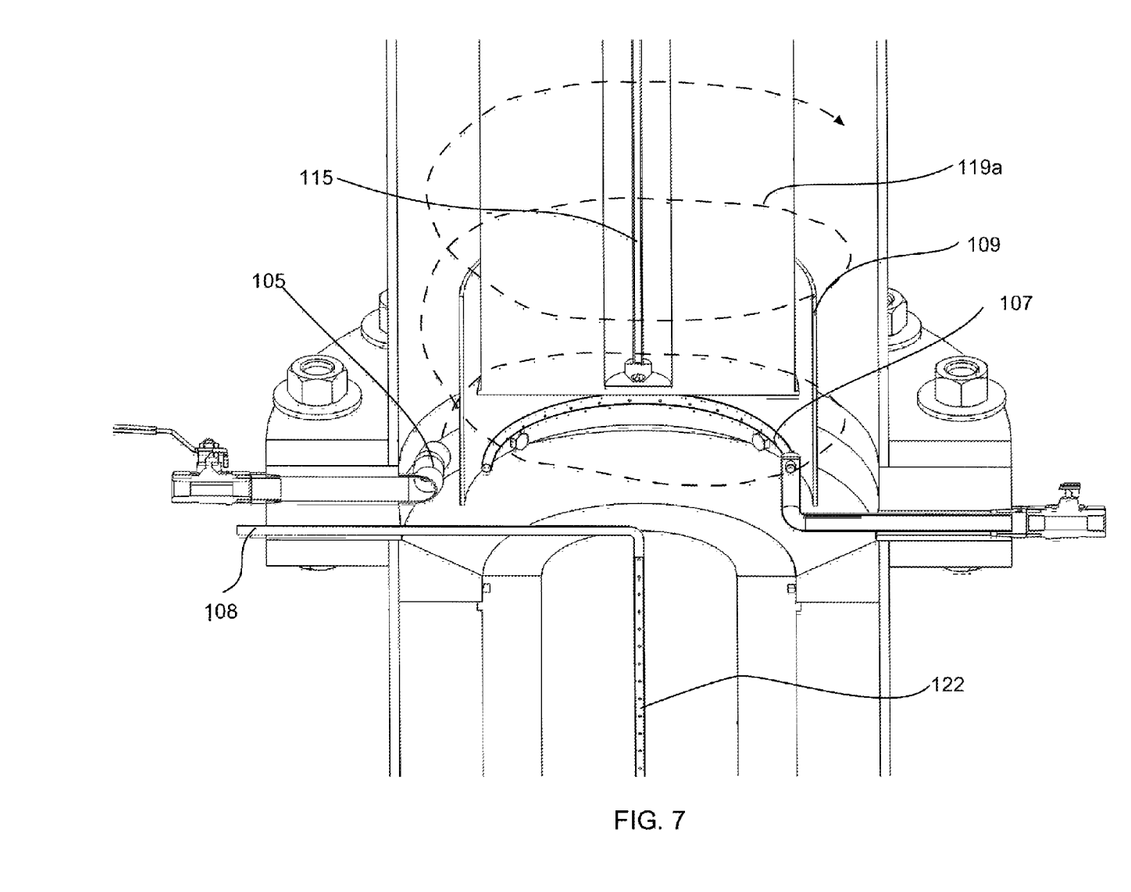
FIG. 7 is a perspective view showing the fluid to be filtered flowing in from the fluid inlet.

A spacer plate 104 is placed between the upper and lower chambers and has ports 105, 106 extending therethrough. The port 105 is the fluid inlet for introducing the fluid to be filtered, and port 106 with valve 106a outside the spacer plate 104 is an air inlet line that is connected to an air distribution ring 107 located inside the bottom of upper chamber 102 below the exterior-to-interior cartridge filter 119a. An interior to exterior filter 119b extends from the bottom of spacer plate 104 inside lower chamber. An air release line 108 introduces air from the air flow volume detector 121 (shown later in FIG. 4) for determining the amount of particulate matter accumulated in the interior-to-exterior cartridge filter 119b, as explained further below. The fluid inlet 105 extends through the spacer plate 104 of the vessel 100. The fluid to be filtered flows through the fluid inlet 105 that extends through the spacer plate 104 and enters the vessel 101 in a radial and tangential flow path around the internal circumference of the spacer plate 104. The influent fluid inlet 105 communicates with the vessel 101 and contains a valve 110 which is selectively movable between open and closed positions with the fluid inlet 105. The fluid to be filtered flows from outside the cartridge filter 119a into the inner hollow core 150, while leaving the particulate matter at the outside surface of the cartridge filter 119a. A cylindrical baffle sleeve 109 is attached to the interior of upper fluid chamber 102 and extends around the air distribution ring 107 and extends around the exterior of the filter cartridge. Referring to FIG. 1B, which is a top-down view of the filter housing. As shown in FIG. 1B, the influent fluid inlet 105 has an elbow in the tube after it enters the filter housing, such that the influent fluid flow is directed in a swirl fashion, preferably outside the air baffle sleeve 109 inside the housing. The flow path can be seen in FIG. 7, which is a perspective view of the filter housing. As shown by the dashed arrow, the fluid to be filtered enters the filter housing through the turned fluid inlet 105, and naturally swirls around the baffle sleeve 109 and/or the exterior-to-interior cartridge filter 119a. The swirling flow path is around the outer surface of the cartridge filter 119a, and therefore reduces the chances of filter cake buildup.

Figure 1C:
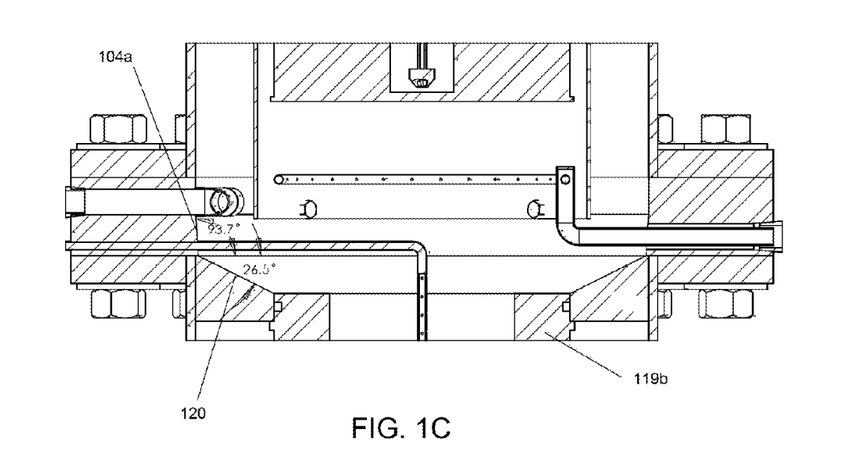
FIG. 1C shows the detailed view of the cross-section of the mid-section of filter housing, where the spacer plate and solids funnel ring are each sloped at different angles.

Also referring to FIG. 1C, showing in detail the sloped sidewall of both the spacer plate 104 and the solids funnel ring 120. Comparing to the straight sidewalls of the filter housing 101, the lower portion 104a of the spacer plate is sloped at a preferable angle of 93.7° (or 86.7° from horizontal). This will facilitate the precipitating particulate matter to further slide down to the solids funnel ring 120. As shown herein, the top surface of the solids funnel ring 120 is further sloped at a preferable angle of 26.5°, such that the precipitating particulate matter can be easily washed down to the inner hollow core 151 of the lower cartridge filter 119b. It is to be noted that the angles of the lower portion 104a of the spacer plate 104 and the solids funnel ring 120 are exemplary only and can be altered to achieve different results. It is the inventors' discovery that an angled connection between the sidewall 104a of the spacer plate 104 and the solids funnel ring 120, combined with the swirling fluid flow path inside the filter housing, can facilitate the precipitating particulate matter moving into the inner hollow core of the inside-out cartridge filter 119b. With this angled interface, instead of a curved one, the particulate matter is less likely to settle on the solids funnel ring 120.

Also shown in FIGS. 1B-C the air distribution ring 107 is circular in shape. The diameter of the air distribution ring 107 is preferably substantially the same or slightly bigger than the outer diameter of the cartridge filter 119a. This ensures the maximum scrubbing off the outer surface of the cartridge filter 119a by the air bubble discharged by the air distribution ring 107. During the filtration process compressed air can be introduced into the upper fluid chamber 102 and if an air baffle sleeve 109 is part of the design, the sleeve further directs the air bubbles around the outside of filter cartridge 119a to scrub its outer surface.

Figure 2:
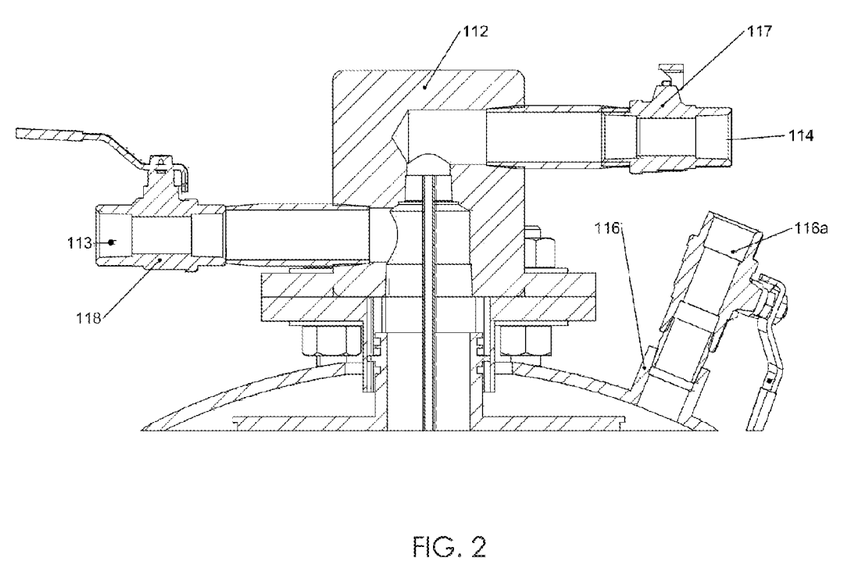
FIG. 2 is a detail cross-sectional view of the dual flow crossover showing the air inlet and clean fluid out connections.

An air and pressure vent 116, as shown in FIG. 2, is also provided at the top of the vessel 100 upper chamber 102 with a control valve 116a of known construction, which is selectively movable between open and closed positions thereon to selectively control venting of air, as described below.

Referring back to FIG. 1, the lower chamber 103 of the vessel 101 houses the interior-to-exterior flow filter 119b positioned below the solids funnel ring 120, which is in full communication with the influent fluid contained within the vessel 101. This filter may be a cartridge filter is the same or similar construction of 119a or may be a bag filter or any other filter media capable of trapping particulate material depending on the fluid that is filtered and the size or type of particulate matter in the fluid. As discussed above, the construction of the solids funnel ring 120 enables two objectives: (1) to guide the influent fluid to the inner hollow core 151 of the cartridge filter 119b such that the filtration path is from the interior to the exterior of the cartridge 119b, and (2) to guide the particulate matter, removed from the outer surface of the cartridge filter 119a, into the inner hollow core 151 of the cartridge filter 119b by gravity. A perforated tube 122 may be placed within w the inner hollow core 151 core of the interior-to-exterior flow filter 119b that is connected to the air release line 108 extending through the spacer plate 104 that in turn connected to the air flow volume detector 121.

At the bottom of the lower chamber 103 is a purge fluid outlet 123 and contains a valve (not shown) of known construction, which is selectively movable between open and closed positions. An air inlet purge line 125 with valve 126 is located on the lower chamber. Both of the purge fluid outlet 123 and the air inlet purge line 125 are in fluid communication with the purge fluid in the lower chamber 103. By "purge fluid" it means the fluid filtered by the interior-to-exterior cartridge filter 119b, which will exit the filter housing lower chamber 103 through the purge fluid outlet 123.

As shown in FIG. 1, the influent fluid to be filtered, which contains contaminate or recoverable particulate matter, passes through the open valve 110 and influent fluid inlet 105 and initially fills chambers 102 and 103. Once both chambers are full of fluid, the influent fluid entering though the elbow of fluid inlet 105 in a swirling manner described above and the fluid passes through the exterior-to-interior cartridge filter 119a and exits the filter housing 101 through the clean fluid outlet 113 at the top of the filter housing 101. The influent fluid has a pressure that will naturally push the clean fluid inside the cartridge filter 119a up to the clean fluid outlet 113. In the initial stage of a filtration cycle only the influent fluid inlet valve 110 and the clean fluid outlet valve 118 are open while all other valves are closed. The influent fluid inlet 105 turns along the inner diameter of the spacer plate 104. Therefore as the influent fluid enters through the influent fluid inlet 105 it is directed in a radial and tangential flow path around the internal circumference of the spacer plate 104 of and is channeled around the air baffle sleeve 109, such that heavier contaminate or recoverable particulate matter will drop by the circumferential flow and gravity, thereby falling to the interior-to-exterior cartridge filter 119b. As explained above, the spacer plate 104 and the solids funnel ring 120 are configured to guide the particulate matter into the inner hollow core 151 of the interior-to-exterior cartridge filter 119b. The lighter contaminate or recoverable particulate matter travels upward with the influent fluid and, as the filtration continues, falls down to the cartridge filter 119b like the heavier particulate matter or may eventually leave deposits on the outer surface of the exterior-to-interior cartridge filter 119a.

During filtration process, air can be brought into the filtration system by pump cavitation, leaks on suction piping or just air or gas being relieved due to pressure changes. This air will move to the top of the vessel and needs to be relieved to keep the cartridge filter fully submerged for the best efficiency in operation. The air and pressure vent 116 and the control valve 116a thereon, which is selectively movable between open and closed positions, control the venting of air during the filtering operation to maintain the fluid level above the exterior-to-interior flow disposable cartridge filter 119a.

In order to avoid the formation of a substantially non-porous particulate filter cake around the exterior surface of the exterior-to-interior cartridge filter 119a, the flow rate at the influent fluid inlet 105 is controlled by the valve 110 to achieve optimal flow rate by incorporation of a conventional flow meter of known design, which may be affixed to the influent fluid inlet 105. Or, alternatively, the clean fluid outlet 113 and the valve 110 and 118 can be controlled to maintain the proper flow rate.

The controlled flow rate is not limited, depending on different influent to be filtered, the nature of the particulate matter, and the size and number of cartridge filters used, so long as the empirical data shows that it is less likely to build up the non-porous filter cake at such flow rate for such fluid. In one embodiment, the flow rate is 1.5 gallon per minute. In another embodiment, the flow rate is 2 gallons per minute. In another embodiment, the flow rate is 2.5 gallons per minute. The goal is to maintain the differential pressure across the filter at a relatively low range. The differential pressure is measured by a pressure transducer and continuously monitored throughout the operation. Taking the clean fluid inside the inner hollow core as the baseline pressure, preventing particulate buildup can be achieved when the differential pressure outside the cartridge filter 119a is no more than about 10 psi greater than the baseline pressure. In a preferred embodiment, the differential pressure between the outside and inside of the cartridge filter is 0-2 psi, and more preferably 1.5 psi. The viscosity of the fluid to be filtered may vary, but the range of differential pressure is similar for different fluids.

Additionally, the pore size of the cartridge filter 119a may also contribute to the fact that non-porous particulate layer is less likely to form. With a filter having a filter media with pore size less than 5 micrometers, and more preferably 2 micrometers, the particulate matter does not enter the pores, and therefore stays on the outside surface of the cartridge filter 119a.

Figure 3A:
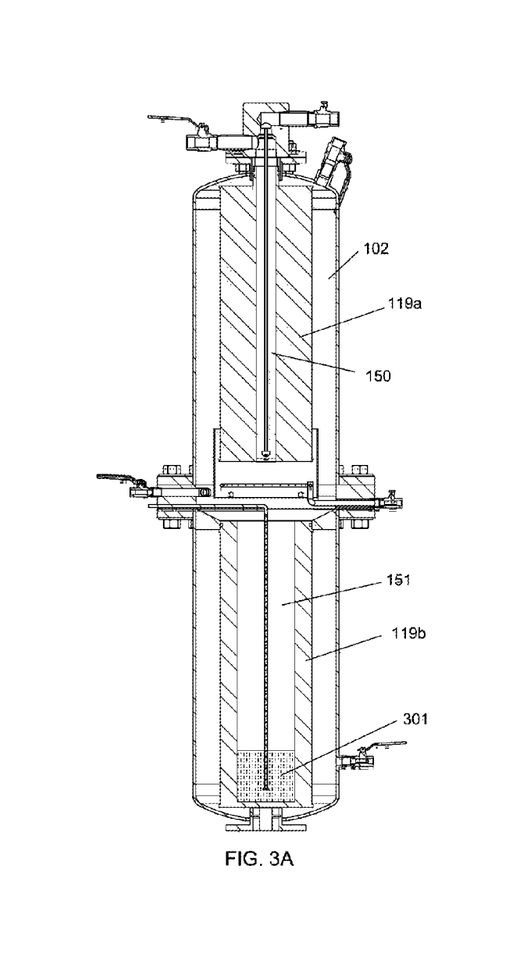
FIGS. 3A-C are detail cross sectional views of the air or gas flow and particulate fall during the cleaning procedure.

When it is desired to clean the exterior-to-interior flow cartridge filter 119a, a pressurized air or gas scrubbing action may be necessary to dislodge the porous particulate filter cake around the exterior of the exterior-to-interior cartridge filter 119a. The influent fluid inlet 105 is closed off with valve 110, the air vent 116 and pressure relief valve 116a at the uppermost end of the upper chamber 102 is opened for relieving pressure and allowing scrubbing air to escape. With reference to FIG. 2, the regulated air or gas inlet valve 117 is opened allowing air or gas to the air diffuser 115 located inside of the exterior-to-interior cartridge filter all the while the clean fluid outlet valve 118 has remained open, allowing scrubbing air or gas to escape. Simultaneously, with reference to FIG. 3, valve 106a located at the spacer plate 104 is opened allowing air or gas to enter the air distribution ring 107 at the base of the exterior-to-interior flow disposable cartridge filter 119a. The bubbles 311 then flow upward between the disposable cartridge filter 119a and the air baffle sleeve 109. This allows the air bubbles 311 to scrub and remove any filter cake of contaminate or recoverable particulate matter from around the exterior of the exterior-to-interior cartridge filter 119a. The purpose of having the air baffle sleeve 109 is to keep the air bubble flow straight up along the outer surface of the cartridge filter 119a. In the mean time, the air diffuser 115 also generates bubbles 312 at the inner hollow core 150 of the cartridge filter 119a.

The pressurized air or gas need only have sufficient pressure to effect the scrubbing. The range of the pressure can be easily chosen by a person skilled in the art to be both effective and energy efficient. In one embodiment, the pressurized air or gas has a pressure less than about 50 psi. In a preferred embodiment, the pressurized air or gas has a pressure not higher than about 20 psi.

Figures 3B, 3C:
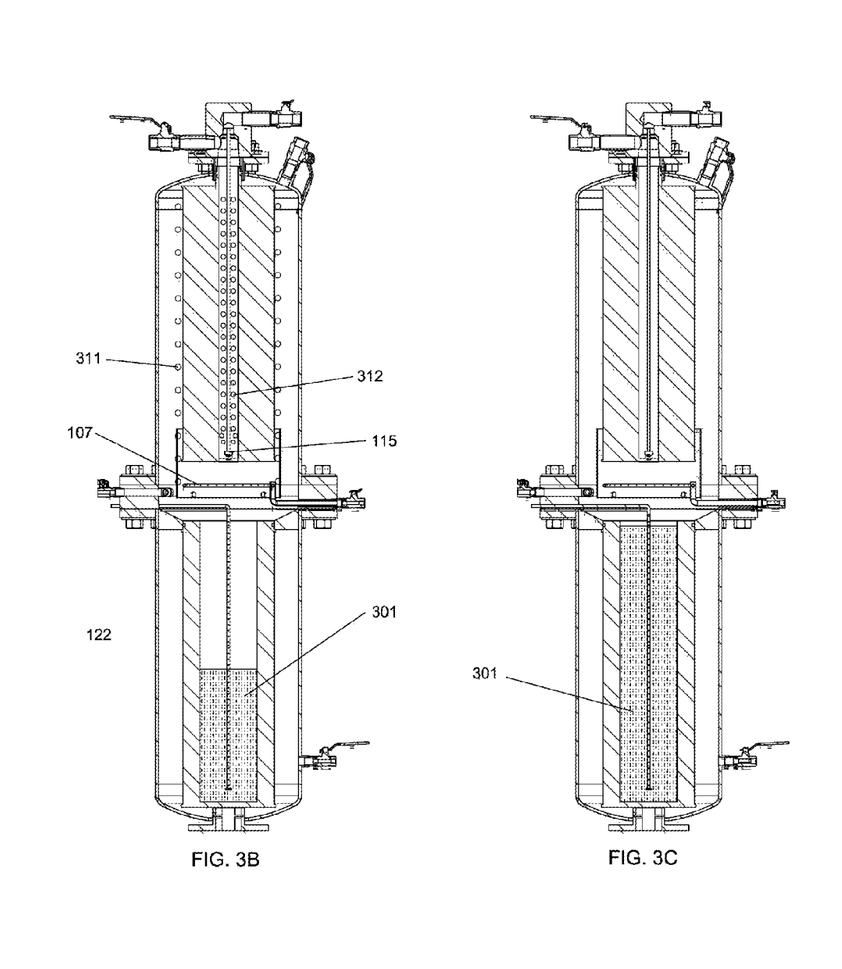

Now, with reference to FIGS. 1 and 3, as the flow to the vessel 101 has been stopped, the dislodged filter cake of contaminate or recoverable particulate matter from around the outer surface of the exterior-to-interior cartridge filter 119a settles by gravity. The particulate matter then enters the inner hollow core 151 of the interior-to-exterior cartridge filter 119b, guided by the path defined by the spacer plate 104 and the solids funnel ring 120. As shown from FIGS. 3A-C, bubbles 311 generated by the air distribution ring 107 agitate the outer surface of the cartridge filter 119a. In the mean time, bubbles 312 generated by the air diffuser 115 inside the inner hollow core 150 of cartridge filter 119a also pushes the fluid back out the cartridge filter 119a, which in turn will dislodge the deposited particulate matter as well. With the two cleaning mechanism working together, the particulate matter 301 continues to accumulate within the cartridge filter 119b, until the system determines that the inner hollow core 151 of the cartridge filter 119b is full and should be removed, such as shown in FIG. 3C.

Figure 4:
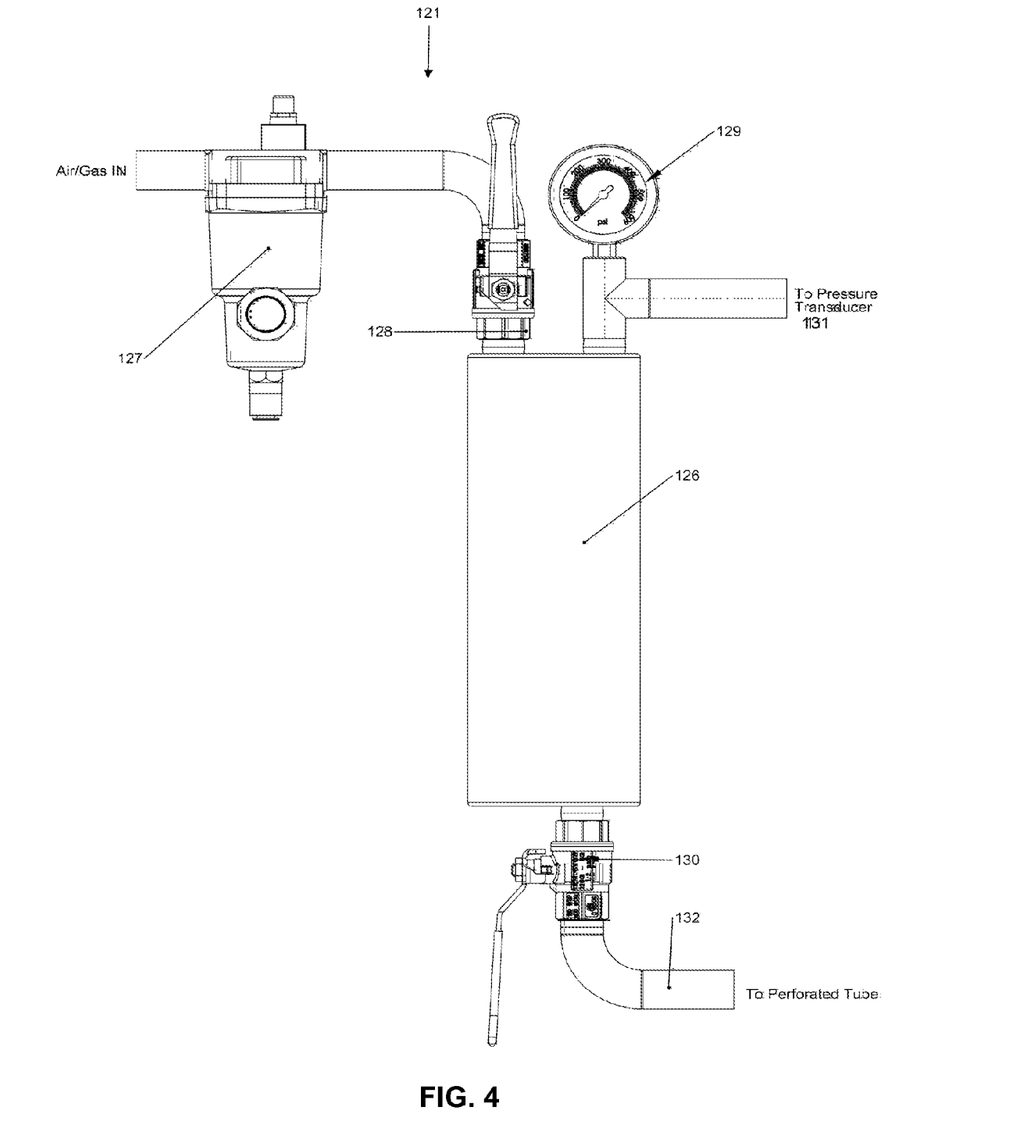
FIG. 4 is a detail cross sectional view of the air flow volume detector.

Now with reference to FIG. 4, before returning to the filtration process and with all valves in the cartridge filter cleaning mode, a check of the volume of contaminate or recoverable particulate matter contained within the inner hollow core 151 of the interior-to-exterior flow disposable cartridge filter 119b is performed by using the air flow volume detector 121. The air flow volume detector 121 is connected to the perforated tube 122 through line 132 to measure the air pressure release through the perforated tube 122. A given volume of compressed air (can also be other suitable gases) is placed in the air chamber 126 by closing discharge valve 130 and opening valve 128 to allow the air flow from the pressure regulator 127 until the chamber is at the desired pressure as indicated by the pressure gauge 129 and subsequent pressure transducer 131 attached to the air chamber 126. In a preferred embodiment, the desired pressure is 5 psi. Air or gas chamber 126 inlet valve 128 is then closed, isolating the air or gas within the air or gas chamber 126. Attached to the discharge line 132 is the inlet 108 that extends through the spacer plate 104 and connects to the perforated tube 122 that is placed within the inner hollow core 151 of the interior-to-exterior cartridge filter 119b. The number of perforation on the perforated tube 122 is not limited, as long as they are vertically separated for better measuring the sediment level in the inner hollow core 151.

When the particulate matter accumulated as slurry and will form a solid cake in the inner hollow core 151 of the cartridge filter 119b, the perforation(s) in tube 122 are surrounded (and possibly partially or fully plugged) by the slurry, which will inhibit air passing out of the perforations. The more perforations being plugged, the slower it is for the air to escape, hence the slower pressure decrease as measured by the pressure transducer 131. To initiate the measuring process, air (or other suitable gas) is released from the air flow volume detector 121 by fully opening valve 130, allowing the air to flow through the discharge line 132 to the inlet 108 to the perforated tube 122. The air pressure in the perforated tube 122 is measured by the pressure gauge 129 and simultaneously by the pressure transducer 131 for more accurate readings. These readings provide the air or gas pressure reduction in relation to time by predetermined schedule as to the volume of contaminate or recoverable particulate matter contained within the interior-to-exterior flow disposable cartridge 119b. In other words, the slower the pressure reduction, the more accumulated particulate matter within the interior-to-exterior flow disposable cartridge filter 119b, because more perforations have been blocked by the slurry. By comparing the pressure reduction rate to a chart obtained through previous testing, an operator can determine the level of accumulated particulate matter inside the filter 119b. Once particulate matter has filled filter 119b, it should be removed and either replaced or cleaned and replaced in order to continue the filtration process.

Upon completion of the cleaning of the exterior-to-interior cartridge 119a and the measuring process to determine the contaminate or recoverable particulate matter volume in the interior-to-exterior flow disposable cartridge 119b, the operator then determines whether the system has remaining capacity for further filtration process or the cartridge filter needs to be changed. In the former situation the recovery system may be put back into filtration mode by reversing the procedure used to prepare for filter cleaning. In the latter case, the operator shuts down the filtration system and replaces the full cartridge filter with a new one.

Additional filtering and cleaning procedures along with the measuring the collection of the particulate in filter 119b described above may be repeated as desired. This filtering method and apparatus can prolong the life of disposable filter cartridges, because the lack of particulate build-up and cleaning steps allow re-use of the cartridges. A disposable filter cartridge can be re-used until filter flow is inhibited. Both filters 119a and 119b can be used until the fluid cannot pass at an adequate flow rate.

Figure 5A:
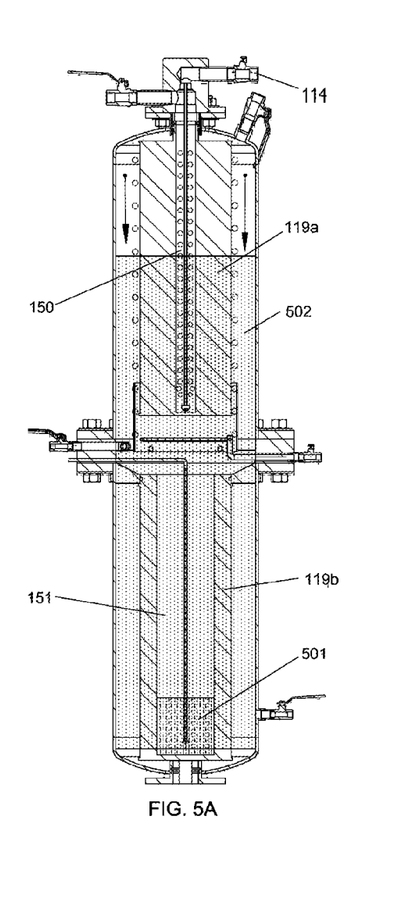
FIG. 5A-C are cross-sectional views of the evacuation stages.

With reference to FIGS. 1 and 5A-C, when completing the filtering operation for the fluid or the need to shut the system down to change one of the cartridge filters 119b or 119a, a cleaning of the exterior-to-interior flow disposable cartridge filter 119a can be performed, and then an evacuation of the fluid and contaminate or recoverable particulate matter is instituted. In FIG. 5A, the influent fluid inlet 105 remains closed with valve 110, while the air vent 116 and pressure relief valve 116a at the uppermost end of the upper chamber 102 remain open to relieve pressure and allow scrubbing air or gas to escape. With reference to FIG. 2, the regulated air or gas inlet valve 117 remains open, allowing air or gas to flow in from gas inlet 114 to and exit from the air diffuser 115 located inside the inner hollow core 150 of cartridge filter 119a, while the clean fluid outlet valve 118 is closed preventing air or gas escape. This creates turbulence and/or agitated flow that "rocks off" the contaminate or recoverable particulate matter deposited on the exterior surface of the cartridge filter 119a. The arrows indicate the direction that the air pushes down the fluid. Valve 106a located at the spacer plate 104 remains open, allowing air or gas to enter the air distribution ring 107 at the base of the exterior-to-interior flow disposable cartridge filter 119a and flowing upward between the cartridge filter 119a and the air baffle sleeve 109. The incoming air will replace the fluid inside the vessel and pushes the fluid through the cartridge filter 119b.

Figure 5B:
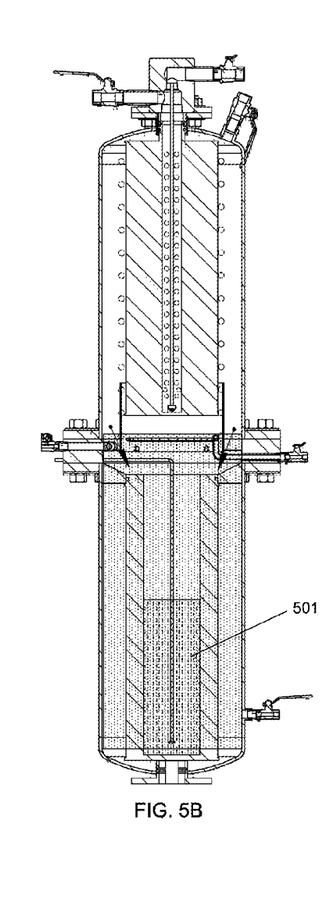
Figure 5C:
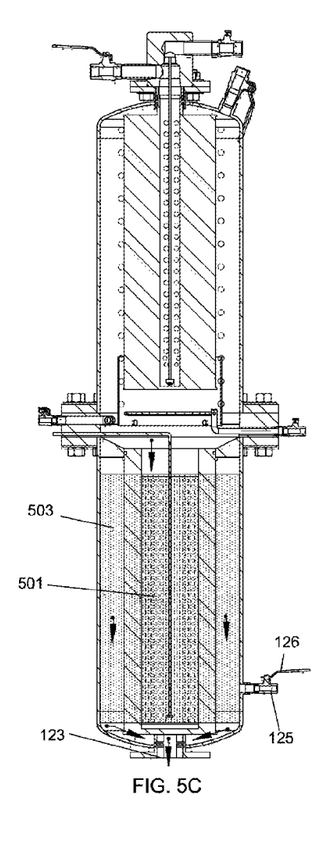

At this time the purge fluid outlet valve 124 is opened while continuing the flow of air or gas from the air or gas inlet valve 117 to the air diffuser 115, and the air or gas inlet valve 106a to the air distribution ring 107. As shown in FIG. 5B with reference to FIG. 1, the air or gas vent 116 and pressure relief valve 116a are now closed, allowing a buildup of air or gas pressure in the vessel 101 upper chamber 102, displacing the fluid and carrying the contaminate or recoverable particulate matter past the spacer plate 104 and the solids funnel ring 120 into the interior core 151 of the cartridge filter 119b, as indicated by the arrows. The maximum pressure buildup is not limited, and in a preferred embodiment the maximum pressure is about 25 psi inside the vessel 101. In another embodiment, the pressure is increased by a 5 psi increments until maximum pressure is reached. At such time as a significant pressure buildup is recorded, the flow of air or gas from the air or gas inlet valve 117 to the air diffuser 115 and the air or gas inlet valve 106a to the air distribution ring 107 is eliminated by closing valves 117 and 106a, allowing the pressure buildup to subside as the fluid is pushed through the interior-to-exterior flow disposable cartridge filter 119b located in the vessel 101 lower chamber 103, as shown in FIG. 5C. In the mean time, the contaminate or recoverable particulate matter 501 accumulates within the interior of the cartridge filter 119b.

Figure 6:
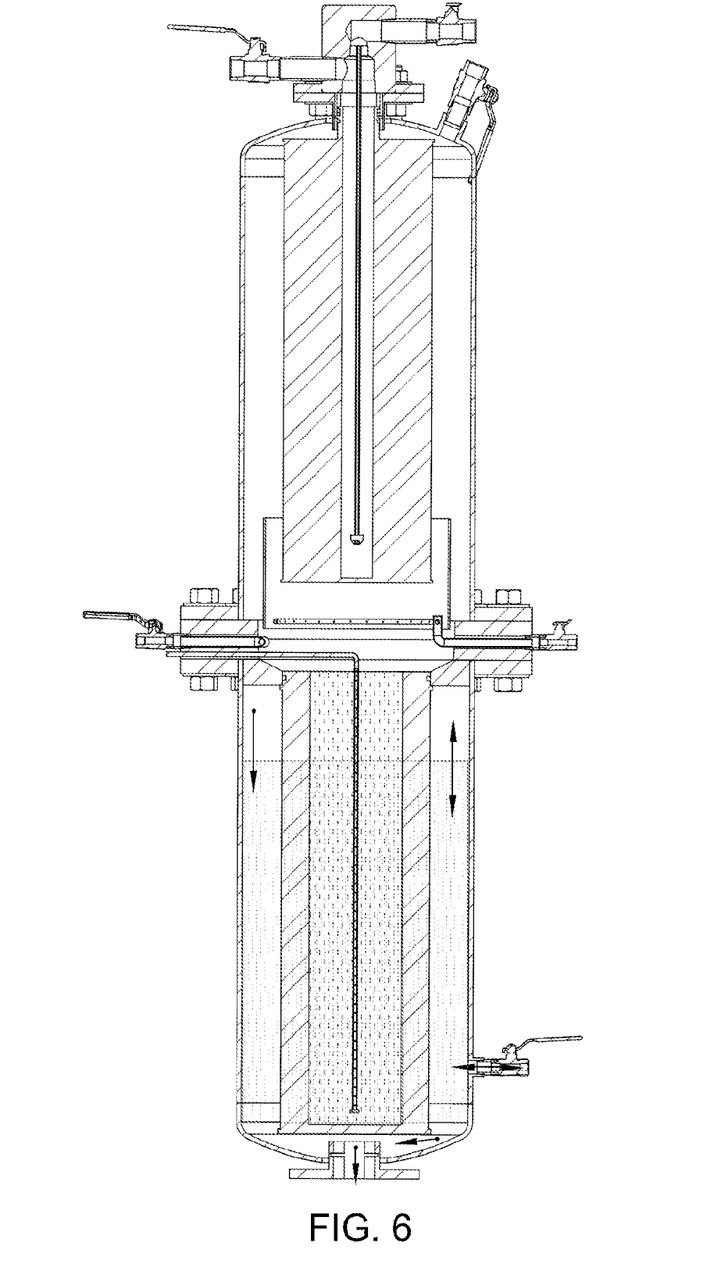
FIG. 6 is a detailed cross sectional view of the final purge of fluid from the vessel.

With reference to both FIGS. 1 and 6, a final step in the total fluid evacuation of the vessel 101 is accomplished by opening the air or gas in purge valve 126 displacing any remaining fluid out the purge fluid outlet 123. At the completion of this stage the filter system 100 has completed a filtering cycle and the housing 101 may be opened to change the disposable cartridge filter 119a and recover contaminate or recoverable particulate matter from the interior-to-exterior flow disposable cartridge filter 119b.

Although the invention has been described in terms of specified embodiments which are set forth in detail, it should be understood that this illustration only and the invention is not necessarily limited thereto, since alternative embodiments and operating techniques will become apparent to those skilled in the art in view of the disclosure. Accordingly, modifications are contemplated which can be made without departing from the spirit of the described invention such as a manual operation or a fully automated system.

What is claimed is:

1. A system of removing particulate matter in a fluid to be filtered, comprising:
    a generally cylindrical filter housing having an upper chamber and a lower chamber;
    an exterior-to-interior hollow core filter in said upper chamber, said exterior-to-interior filter having an open end and a closed end;
    an interior-to-exterior hollow core filter in said lower chamber, said interior-to-exterior filter having an open end and a closed end, said open end being in fluid communication with the bottom portion of said upper chamber;
    an inlet for introducing a fluid to be filtered located on the housing between the exterior-to-interior filter in the upper chamber and the interior-to-exterior filter in the lower chamber extending at an angle inside the housing to direct the fluid flow in a circular flow around the inside of the filter housing;
    a ring engagingly surrounding an uppermost portion of said interior-to-exterior hollow core filter and extending to an interior surface of said lower chamber defining an annular chamber therebelow;
    a clean fluid housing outlet in fluid communication with said open end of said exterior-to-interior hollow core filter;
    a first gas inlet; and
    a gas diffuser in fluid communication with said first gas inlet and located within the hollow core of the exterior-to-interior filter in the upper chamber of the filter housing.

2. The system of claim 1, further comprising:
    a second gas inlet, wherein said second gas inlet is in fluid communication with a generally circular gas dispersion ring disposed under the exterior-to-interior filter in the upper chamber such that the air bubble from the circular gas dispersion ring will rise above the exterior surface of the exterior-to-interior filter in the upper chamber.

3. The system of claim 2, further comprising:
    a third gas inlet for introducing a gas into the filter housing to displace the fluid inside said filter housing through a purge fluid outlet located at the bottom of said lower chamber of said filter housing.

4. The system of claim 1, further comprising:
    a generally cylindrical baffle disposed inside the upper chamber of the filter housing extending from and surrounding the gas dispersion ring to surround at least the lower portion of the exterior-to-interior filter in the upper chamber of the filter housing.

5. The system of claim 1, further comprising:
    a perforated tube extending through the hollow core of the interior-to-exterior filter in the lower chamber of the filter housing, wherein said perforated tube is in fluid communication with a pressure sensor to measure pressure change as the perforations become blocked.

6. The system of claim 1, wherein said exterior-to-interior filter comprises a filter media having a pore size of less than 5 micrometers.

7. The system of claim 1, wherein said exterior-to-interior filter comprises a filter media having a pore size of 2 micrometers.

8. The system of claim 1, further comprising an annular spacer in the housing between the upper chamber and the lower chamber, wherein the interior surface of the annular spacer is sloped to form an interior angled connection between the upper chamber and the lower chamber.

9. The system of claim 8, wherein the interior surface of said annular spacer is sloped at an angle between 80 and 90 degrees.

10. The system of claim 1, wherein said ring is a solids funnel ring having a sloped upper surface.

11. The system of claim 10, wherein said solids funnel ring is sloped at an angle between 20 and 30 degrees.

\* \* \* \* \*